(12) United States Patent
Herger et al.

(10) Patent No.: US 9,942,186 B2
(45) Date of Patent: Apr. 10, 2018

(54) EMAIL CHAIN NAVIGATION

(71) Applicant: INTERNATIONAL BUSINESS MACHINES CORPORATION, Armonk, NY (US)

(72) Inventors: Lorraine M. Herger, Danbury, CT (US); Neal M. Keller, Pleasantville, NY (US); James R. Kozloski, New Fairfield, CT (US); Matthew A. McCarthy, Holly Springs, NC (US); Clifford A. Pickover, Yorktown Heights, NY (US); Andrew P. Wyskida, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 14/837,744

(22) Filed: Aug. 27, 2015

(65) Prior Publication Data
US 2017/0063765 A1    Mar. 2, 2017

(51) Int. Cl.
*G06F 15/16* (2006.01)
*H04L 12/58* (2006.01)

(52) U.S. Cl.
CPC ............ *H04L 51/22* (2013.01); *H04L 51/046* (2013.01); *H04L 51/08* (2013.01); *H04L 51/14* (2013.01); *H04L 51/16* (2013.01); *H04L 51/32* (2013.01)

(58) Field of Classification Search
CPC .... G06N 99/005; G06Q 10/107; H04L 51/16; H04L 51/04; H04L 65/1083; H04L 65/4015; H04L 65/604; G06F 17/30867
See application file for complete search history.

(56) References Cited

U.S. PATENT DOCUMENTS

| 8,386,574 | B2 | 2/2013 | Chidlovskii et al. |
| 8,468,168 | B2 | 6/2013 | Brezina et al. |
| 2004/0107159 | A1* | 6/2004 | Heil ........... G06Q 40/04 705/37 |
| 2006/0155809 | A1* | 7/2006 | Arav ........... G06Q 10/107 709/204 |
| 2007/0143298 | A1 | 7/2007 | Surendran et al. |

(Continued)

OTHER PUBLICATIONS

Blei, D.M. et al., "Latent dirichlet allocation," The Journal of Machine Learning Research, vol. 3, 2003, pp. 993-1022.

(Continued)

*Primary Examiner* — Peling Shaw
(74) *Attorney, Agent, or Firm* — Cantor Colburn LLP; Vazken Alexanian

(57) ABSTRACT

Technical solutions are described to arbitrarily order and access email messages based on text analysis and social network analysis. One general aspect includes a system that includes an email server and an email client. The email server generates a topic map of email messages stored on the email server. The email server also generates a social map of users with accounts on the email server. The email server receives an email message from a first user, the email message directed to a second user. The email server sends the email message to a third user in response to determining that the email message is relevant to the third user. The present document further describes examples of other aspects such as methods, computer products.

11 Claims, 8 Drawing Sheets

(56) References Cited

U.S. PATENT DOCUMENTS

| | | | |
|---|---|---|---|
| 2009/0299970 A1 | 12/2009 | Rodriguez | |
| 2010/0100600 A1* | 4/2010 | Thompson | G06Q 10/107 709/206 |
| 2010/0299763 A1* | 11/2010 | Marcus | G06Q 10/06 726/30 |
| 2011/0055295 A1 | 3/2011 | Bhide et al. | |
| 2013/0159220 A1 | 6/2013 | Winn et al. | |
| 2013/0169743 A1* | 7/2013 | Beauvais | H04L 12/1827 348/14.08 |
| 2013/0191493 A1 | 7/2013 | Le et al. | |
| 2014/0245178 A1* | 8/2014 | Smith | H04L 51/16 715/753 |
| 2016/0034560 A1* | 2/2016 | Setayesh | G06F 17/2785 707/739 |
| 2016/0034571 A1* | 2/2016 | Setayesh | G06F 17/2785 707/738 |

OTHER PUBLICATIONS

Brunkhorst, I. et al.,"The Beagle++ Toolbox: Towards an Extendable Desktop Search Architecture," in "The Semantic Web: Research and Applications," Springer Berlin Heidelberg, 2006, pp. 348-362.

Crossno, P.J. et al., "Topicview: Visually comparing topic models of text collections," 23rd IEEE International Conference on Tools with Artificial Intelligence, ICTAI, 2011, pp. 936-943.

Dredze, M. et al., "Intelligent email: Reply and attachment prediction." Proceedings of the 13th International Conference on Intelligent User Interfaces, 2008, pp. 321-324.

Ozcaglar, C., "Classification of Email Messages Into Topics Using Latent Dirichlet Allocation," Master's dissertation, Rensselaer Polytechnic Institute, 2008, 37 pages.

List of IBM Patents or Patent Applications Treated as Related; (Appendix P), Filed Jan. 27, 2016; 2 pages.

Lorraine M. Herger, et al., "Email Chain Navigation", U.S. Appl. No. 14/954,551, filed Nov. 30, 2015, 2015, 2015.

\* cited by examiner

EMAIL CHAIN NAVIGATION

BACKGROUND

The present invention relates to email technology, and more specifically, to automatically and arbitrarily arranging email chains based on social network and text analysis.

Navigating a long exchange of email threads (referred to as an email chain) for pertinent information is difficult. Typically, during a long exchange between recipients of an email, each message includes a duplication of the history of the previous exchange. This duplication does not readily provide the social context in which each reply was made, nor does it easily accommodate an ordering of replies beyond temporal ordering. Furthermore, because replies can occur synchronously and may conflict, not all the information in an exchange may be represented in the email chain. In addition, often users of an email system use the email chain as a repository for data included in the email chain, as well as an email attachment during the exchange. The user may refer to the content of the email as a context for storing the attachment files.

SUMMARY

According to an embodiment, a method includes receiving, by a processor, a request sent by a first user, the request being to access a network resource from a plurality of network resources. The method also includes determining, by the processor, authority of the first user to access the network resource based on a topic associated with the network resource and a role of the first user in a social map associated with the network resource. The method also includes facilitating, by the processor, access to the network resource by the first user in response to determining the first user as being authorized.

According to another embodiment, a system includes an email server and an one or more email clients. The email server generates a topic map of email messages stored on the email server. The email server generates a social map of users with accounts on the email server. The email server receives an email message from a first user, the email message directed to a second user. The email server determines a relevance score of the email message with a third user based on a topic of the email message and a social map connection between the first user and the third user. The email server sends the email message to an email client of the third user in response to the relevance score being greater than a predetermined threshold.

According to another embodiment, a computer product includes non-transitory computer readable storage medium that includes computer executable instructions. The non-transitory computer readable storage medium includes instructions to order email messages received by a first user according to a topic map and a social map, where the email messages are ordered in a first area of an email client. The non-transitory computer readable storage medium includes also includes instructions to display a second email message in a second area of the email client in response to selection of a first email message in the first area, where the second email message is not sent to the first user.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for transforming a history of an email exchange (for example, an email chain) into an arbitrarily ordered set of text, wherein the order is determined by analyzing a social network, content of the email exchange, and other messages (such as instant messages) among members of the original distribution list. The history of the email exchange is displayed based on the analysis, further facilitating a user to tunnel from one email exchange into another based on permissions and linkages between one email exchange and another. In addition, the user receives accesses to an email attachment of another person based on the analysis. The email attachment is identified by probabilistic tunneling using an email system or a navigation tool that uses the content of the email exchange for metadata.

In exemplary embodiments, a user is provided with an email interface to use the content of the email, such as text of the email, to perform a contextual search for attachments and other data in a specific an email chain or across multiple email chains in an email server. Alternatively or in addition, the interface facilitates ordering emails according to information other than the time at which each message was sent (or received). In addition, the interface facilitates the user navigating email attachments from another user by identifying email attachments based on the analysis of the email exchange. Further, the interface facilitates the user of a first email exchange navigating to email attachments that are part of a second email exchange based on the context of the two email exchanges, social network relation among users of the two email exchanges, and permissions of the email attachments.

The examples throughout the present document use email messages, however the technical solutions described can be used in context of any other electronic communications such as instant messages, text messages or any other mode of communication.

Figure 1:
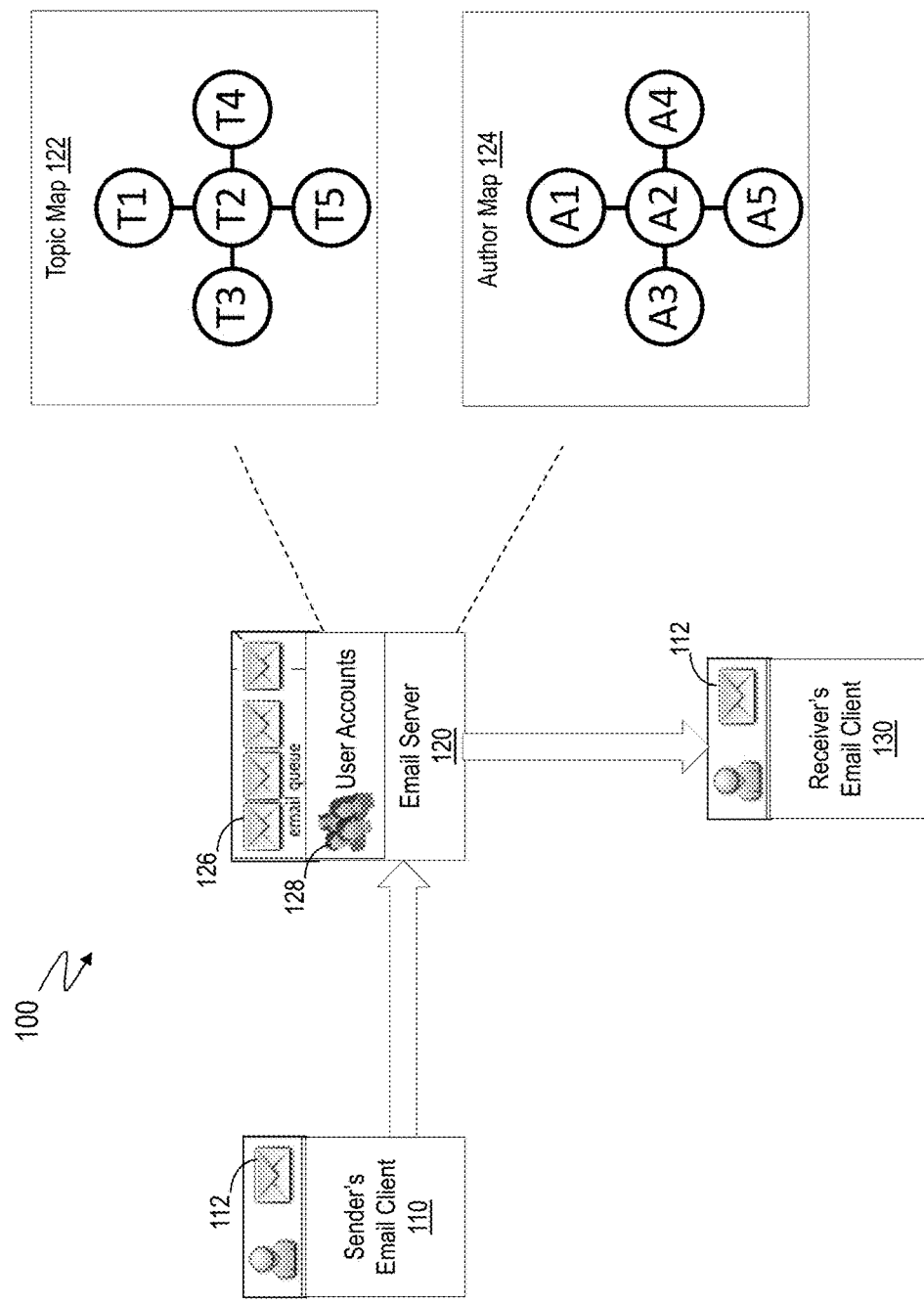
FIG. 1 illustrates an example system for ordering email messages based on social network and text analysis in accordance with an embodiment.

FIG. 1 illustrates an example system 100 for ordering email messages based on social network and text analysis. The system 100 includes email clients 110 and 130, and an email server 120. In other examples the system 100 may include other components, such as additional email servers, email clients, routers and other network equipment. The email clients 110 and 130 communicate with the email server 120 via a network, such as a local area network (LAN), wide area network (WAN) or any other network. In one example, the illustrated email server and email clients may be part of an enterprise network. The email clients 110 and 130 and the email server 120 communicate using one or more network communication protocols, such as Simple Mail Transfer Protocol (SMTP), Internet Message Access Protocol (IMAP), post office protocol (POP), or any other network communication protocol.

The email clients 110 and 130 are communication apparatus that can send/receive an email message and display the email message. For example, the email client may be a computer such as a laptop computer, a desktop computer, a smartphone, a tablet computer, a phone, or any other communication apparatus. The email client includes hardware such as electronic circuitry including a processor, a non-transitory memory, a communication interface, an output hardware, an input hardware, and other such hardware components. The memory includes computer executable instructions that the processor may execute. The email client may execute email software such as OUTLOOK™, THUNDERBIRD™, MAIL™, LOTUS™, or any other email software.

The email software provides a user interface for a user to organize email messages received. The email software may also facilitate editing and sending email messages. In an example, the email client, via the user interface, may add and/or receive one or more email attachments in an email message. In addition or alternatively, the email client may facilitate the user to configure access rights of the email message and/or the email attachments.

In the embodiment illustrated in FIG. 1, the email client 110 is a sender's email client, and the email client 130 is a receiver's email client. For example, the email client 110 sends an email message 112 directed for the email client 130. The email client 110 transmits the email message 112 to the email server 120. The email client 130 receives the email message 112 from the email server 120 and facilitates a user of the email client 130 to access the received email message 112.

The email server 120 is a communication apparatus that receives email messages from one or more email clients and directs the email messages to the email clients according destinations specified by the email messages. The email server 120 includes hardware such as electronic circuitry. For example, the email server 120 includes a processor, a non-transitory memory, a communication interface, an output hardware, an input hardware, and other such hardware components. The memory includes computer executable instructions that the processor may execute. For example the email server 120 may execute email server operating system such as MICROSOFT EXCHANGE SERVER™, POSTFIX™, EXIM™, IBM LOTUS DOMINO™, or any other such email server operating system.

For example, the email server 120 receives the email message 112 from the email client 110. In an example, the email server 120 stores email messages 126 that the email server 120 helps to transmit. For example, the email message 112 indicates that the destination of the email message 112 is the email client 130. For example, the email client 110 facilitates a user of the email client 110 to specify the destination(s) of the email message 112. The email message 112 includes the destination in a header or a metadata portion of the email message 112. The email server 120, upon determination that the email client 130 is the destination of the email message 112, transmits the email message 112 for receipt by the email client 130. The email client 130, in turn, facilitates a user of the email client 130 to access the email message 112.

The email server 120 analyzes the email messages 126 that the email server 120 helps to transmit. For example, the email server 120 generates a topic map 122. The topic map 122 represents information using topics as nodes. A topic represents any concept, such as people, countries, organizations, individual files, events, or any other such topic that may be an overarching subject of an email message. The topic map 122 includes associations, representing relationships between topics. The topic map 122 may also include occurrences, representing information resources relevant to a particular topic.

For example the email server 120 analyzes text from the email messages 126 using Latent Dirichlet Analysis (LDA) and Latent Semantic Analysis (LSA) to construct the topic map 122. For example, each email message is associated with every other email message in the email messages 126. Each email association is assigned a relationship weighting. The email server 120, consequently identifies tightly coupled email messages as the email messages that have topics in common. The overall topology of the relationship edges can be viewed and analyzed as a graph such as is illustrated by the topic map 122. In other examples, the topic map 122 may be generated using other techniques and/or algorithms such as using ONTOPIA™, MAJORTOM™, or any other topic map generating algorithm.

In another example, the email server 120 stores user accounts 128 of users that have an account on the email server 120. For example, the user accounts 128 may include profiles of the respective users. A profile may include information such as user's name, address, contact number, alternative email address, and other such information. The email server 120 analyzes the user accounts 128 to generate an author map 124.

For example, the email server 120 uses analyses similar to that to generate the topic map 122 to generate the author map 124. For example, using social network analyses, individual author of each email message are represented as nodes and the connections between all authors as edges to construct the author map 124. The edge between each user in the author map 124 is assigned a weight. The edge between a first user and a second user is assigned a weight based on for example, a frequency of communication between the two users, their common interests, shared projects, photographs, or any other attribute of the respective user profiles. Nodes (i.e. authors) in the author map 124 may be weighted based on expertise levels of individuals. Such expertise may be determined in an automated fashion, for example, based on any of: a company's listing of employees by groups and expertise, an analysis of the content of emails, an analysis of the nature and number of technical papers submitted by an employee, etc. If it is determined through this analysis that a subject matter expert is not included, they may be added to the email chain. Thus, the resulting graph represents social relationships between authors contributing to an email chain.

The email server 120 may combine the topic map 122 and the author map 124 to generate a navigation map. For example, for an email chain the navigation map may be created for traversing elements of the email chain and/or the attachments in the email messages in the email chain. The resulting nodes in the navigation map represent the topic-author combination, and the weighted union of edges represents relationships between topics and/or authors.

In other examples, the email clients 110 or 130 generate and combine the topic map 122 and the author map 124 in response to requests from a user.

Figure 2:
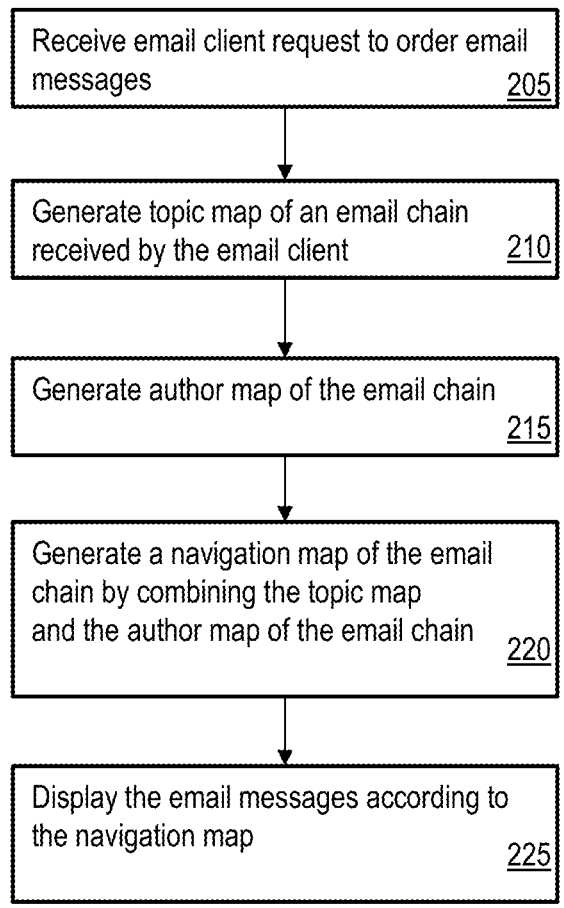
FIG. 2 illustrates a flowchart of example logic to generate a navigation map of email messages in an email chain in accordance with an embodiment.

FIG. 2 illustrates a flowchart of example logic to generate a navigation map of email messages in an email chain. The logic may be implemented by the system 100. For example, the email client 130 receives a request to organize the email messages received at the email client 130, as shown in block 205. The request may specify displaying the email messages in an order other than according to time the email messages were sent (or received). For example, the request may specify displaying the email messages according to topics or authors. In response, the email client 130 (or alternatively the email server 120) analyzes the text from email messages in an email chain received by the email client 130, as shown in block 210. In addition, the email client 130 (or the email server 120) generates the author map for the email messages in the email chain, as shown in block 215. For example, using social network analyses, individual authors of each email message are represented as nodes and the connections between all authors as edges. The email client 130 (or the email server 120) combines the topic map 122 and the author map 124 for the email chain, wherein the resulting nodes represent the topic-author combination, and the weighted union of edges represent relationships between topics and/or authors. The email client 130 (or the email server) generates the navigation map for traversing elements of the email chain and/or the "attachments" in the email messages in the chain, as shown in block 220. The email client 130 displays the email messages in the email chain based on the navigation map, as shown in block 225. For example, the email messages in the email chain may be displayed according to the authors or according to topics. Alternatively or in addition, the email client 130 displays and facilitates traversal of the email messages as a graph.

Figure 3:
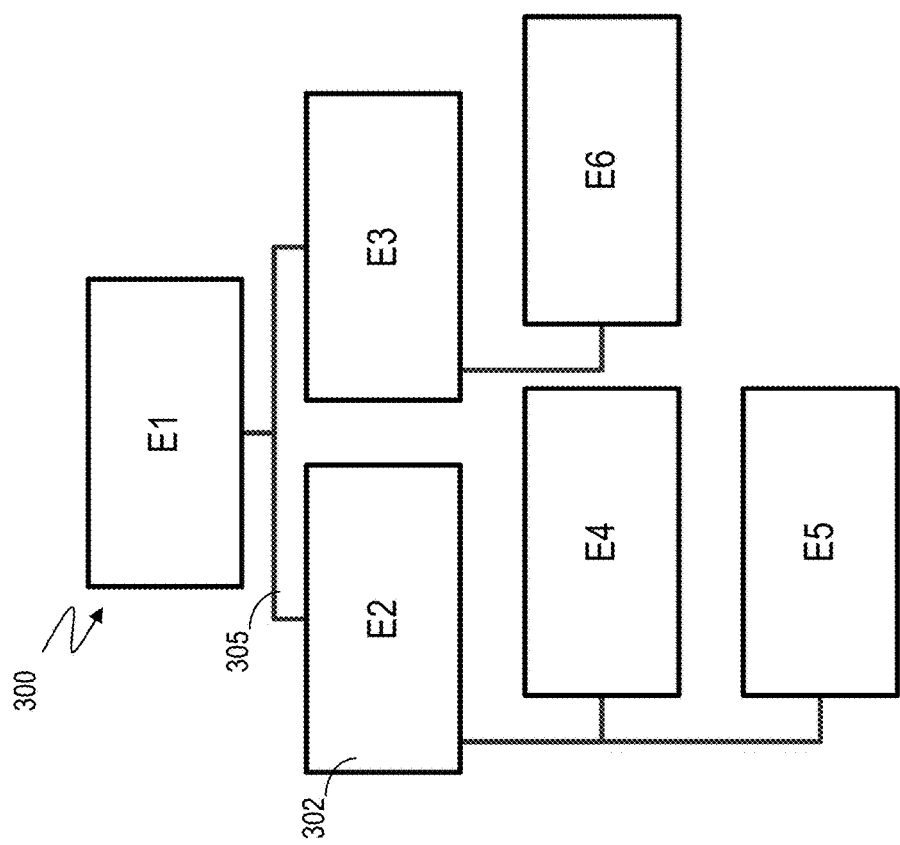
FIG. 3 illustrates an email chain in accordance with an embodiment.

Traditionally, email chains are only time ordered. Based on above techniques, the email client 130 facilitates arbitrary ordering for email chains based on an analysis of social network information and text analytics. During a long exchange between recipients in an email chain, duplication of the history is created. Further, at times replies occur synchronously and may "conflict." For example, FIG. 3 illustrates an email chain in which each "reply" is represented as a node 302, and each edge 305 represents shared history between an email message and subsequent replies. Thus, by ordering the email messages according to the navigation map, the email client 130 provides a social context in which each reply was made.

Additionally, in an example, the email client 130 (or the email server 120) identifies a "new idea" in an email chain. For example, in the topic map 122 corresponding to the email chain, the email client 130 identifies that a particular topic is associated with fewer edges than a predetermined threshold. Further, the email client 130 (or the email server 120) identifies that weak social links for the topic using the author map 124 of the email chain. For example, the email message corresponding to the particular topic is associated with a fewer number of edges in the author map 124 than a predetermined threshold. This same method can be used to identify irrelevant comments for removal via filtering.

Additionally, the technical solutions described in the present document identify relevant email chains not currently part of a user's email chains. For example, if someone else is discussing an identical (or very similar) topic, and gives permission for access, the system 100 may consider this new email chain as part of a user's thread of emails and will be included in the subsequent chain. Such identical (or very similar) chains may be discovered based on the topic map 122 and the author map 124.

Figure 4:
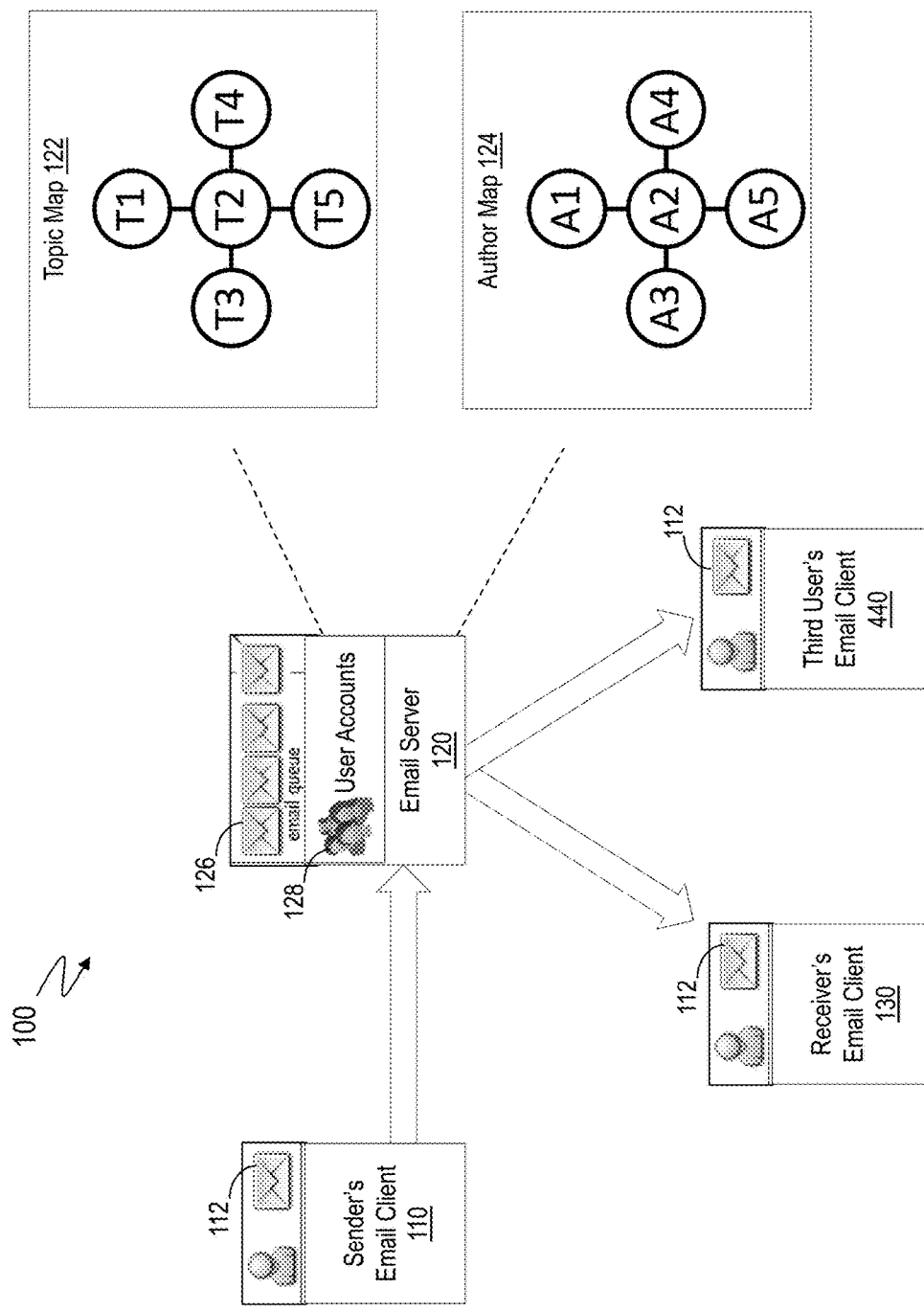
FIG. 4 illustrates another example view of the system in accordance with an embodiment.
Figure 5:
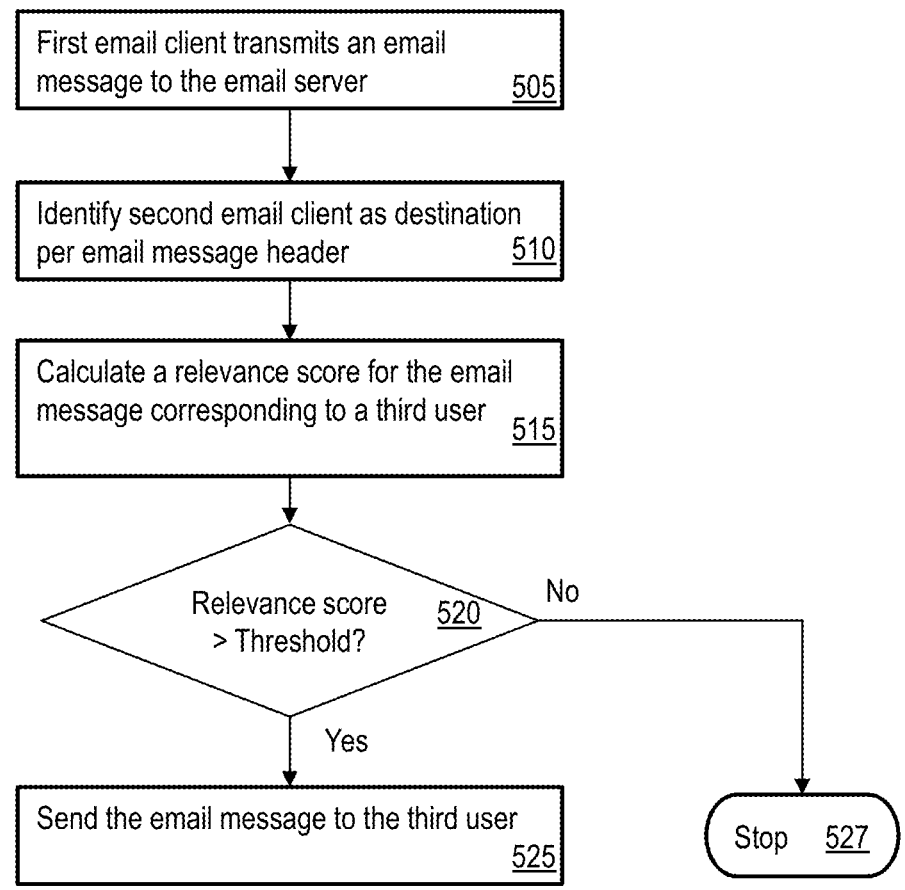
FIG. 5 illustrates a flowchart of example logic for directing an email message according to a relevance score in accordance with an embodiment.

FIG. 4 illustrates another embodiment of the system 100. FIG. 5 illustrates a flowchart of example logic for directing an email message according to a relevance score. For example, the sender's email client 110 sends the email message 112 to the email server 130, as shown at blocks 505. The email server 120 identifies the receiver's email client 130 as the destination of the email message 112 according to the metadata of the email message, as shown at block 510. In addition, the email server 120 calculates, for the email message 112, a relevance score corresponding to a third use, as shown at block 515. The relevance score represents a relation between the email message 112 and the third user. As shown at decision block 520, it is determined if the relevance score is greater than a predetermined threshold. If so, the email server 120 marks the email message 112. Alternatively or in addition, the email server 120 sends the email message 112 to the third user's email client 140, as shown at block 525. If the relevance score is less than or equal to the predetermined threshold, the email server 120 sends the email message 112 only to the receiver's email client 130 as specified by the email message 112.

The relevance score of the email message 112 is calculated based on the topic map 122 and the author map 124. For example, the email server 120 identifies a topic of the email message 112 and an author map connection between the sender and the third user. In another example, the email server 120 may also consider an author map connection between the receiver and the third user when calculating the relevance score. For example, the email server 120 uses the author map connection to identify that the topic is shared by the sender (and/or receiver) and the third user based on at least one of: a frequency of communication between the (and/or receiver) and the third user about the topic. The author map connection may further identify that the (and/or receiver) and the third user are associated with a common project, with the topic corresponding to the common project.

In another example, the author map connection identifies a link between organizational roles of the (and/or receiver) and the third user respectively. For example, the email message 112 may be related to a budget about marketing, the sender may be a chief executing officer (CEO), the receiver may be a chief financial officer (CFO), and the third user may be a chief marketing officer (CMO). The email server 120 may send the email message 112 to the CMO in response to identifying that the email is about 'marketing' topic. The sender may restrict the email server 120 from sending the email message 112 to the third user's email client 140. For example, the sender may setup access rights of the email message 112. The access rights indicate specific users that can access the email message 112. The email server 120 takes the access rights into consideration when calculating the relevance score for the email message 112. Accordingly, in the above case if the CEO restricted the email message 112 only for the CFO, the email server 120 does not send the email message to the CMO, rather only to the CFO as specified by the email message 112.

Furthermore, using the examples described throughout the present document provide technical solutions for a user to access an email attachment of another person using the system 100. This may be referred to as probabilistic tunneling to email attachments. In addition, often users use email chains as repositories for data included in the exchanges as email attachments. The system, such as the system 100 provides the user a context (the email message) for storing files (attachments). Additionally, the approach described herein facilitates identification of relevant email chains not currently part of the user's email chains. For example, if someone else is discussing an identical (or very similar) topic, and gives permission for access, the system may consider this new email chain as part of the user's thread of emails and will be included in the subsequent chain. Such identical (or very similar) chains may be discovered based on topic analysis, social network analysis, and other such techniques described throughout the present document.

Figure 6:
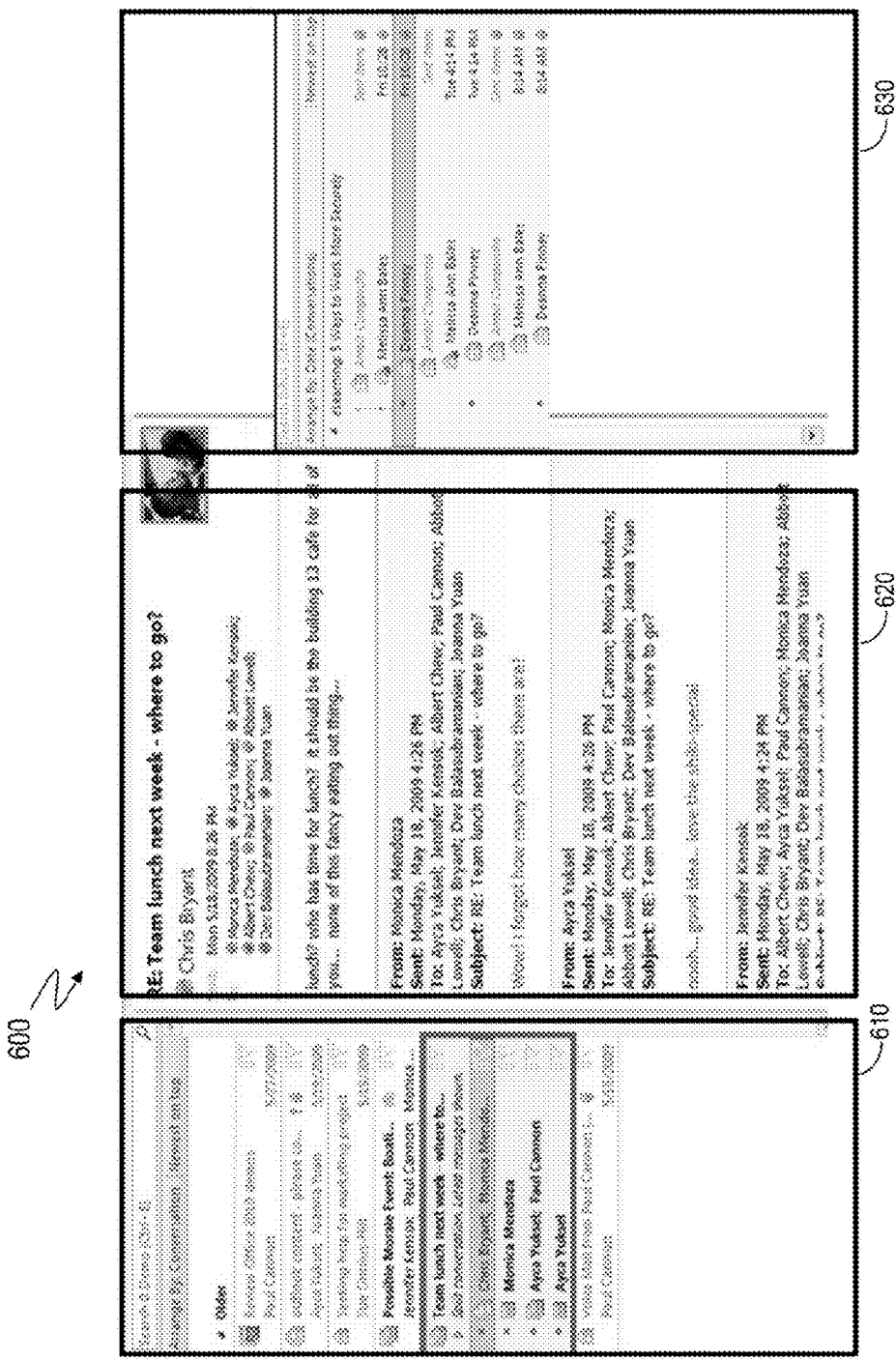
FIG. 6 illustrates an example user interface in accordance with an embodiment.
Figure 7:
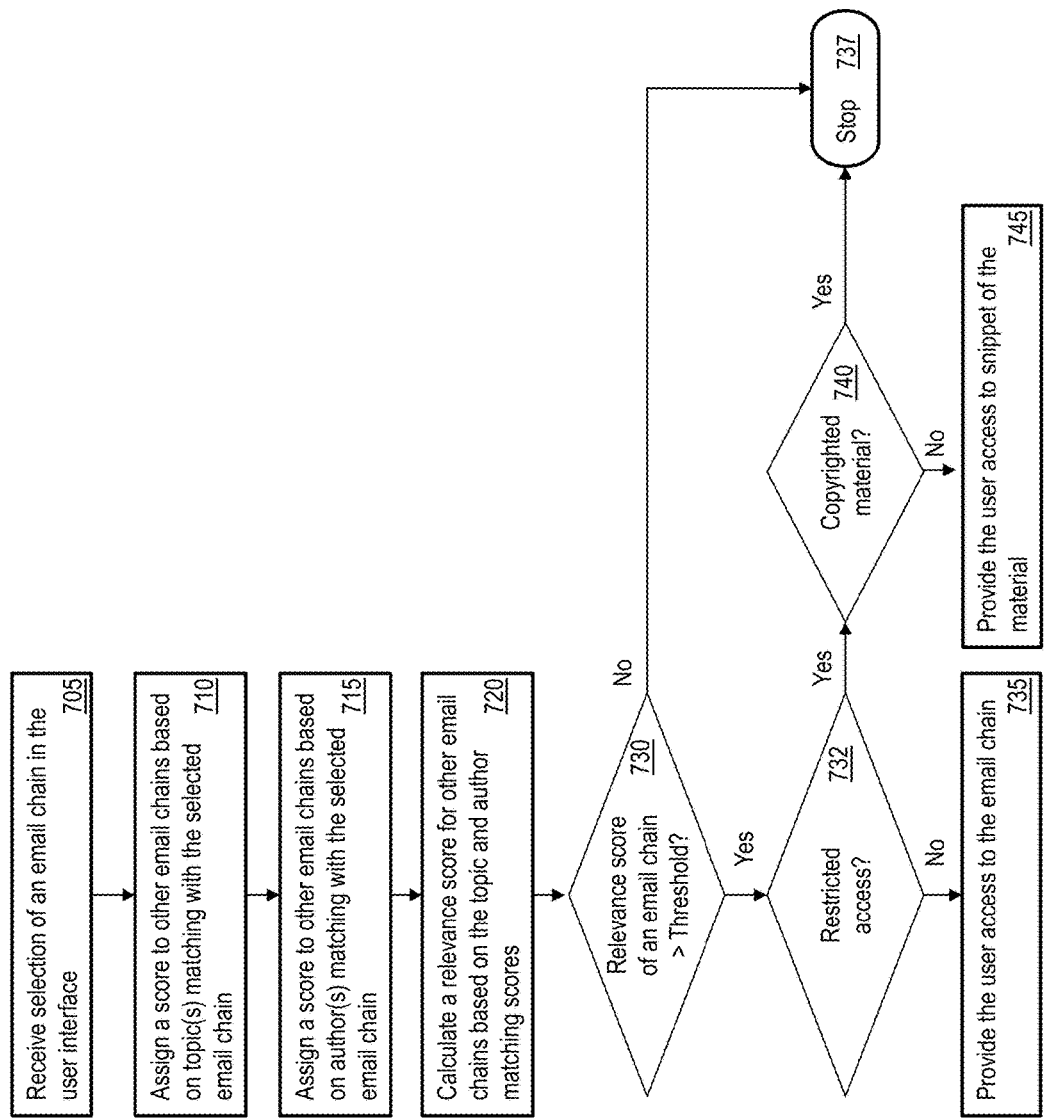
FIG. 7 illustrates a flowchart of example logic for creating a repository and/or a catalog of email attachment content in accordance with an embodiment.

For example, FIG. 6 illustrates an example user interface for a user to access an email attachment of another user and FIG. 7 illustrates a flowchart of example logic for creating a repository and/or a catalog of email attachment content. The other person may be in the user's social network or may be outside of the user's social network, depending on user preferences or third-party preferences. The attachment may be marked by its owner to allow or deny access by others within or outside of the social network, and may point to a repository of relevant documents. The attachment may be a Power Point presentation, a digital artwork (such as an image or multimedia), a technical paper, an ebook, a photo, a Word document, or any other type of data. All or part of the attachment may be made accessible, and the amount of access of content can be marked by a user or third-party.

The receiver's email client 130 displays the user interface 600. In FIG. 6, a user interface 600 includes a first part 610 that displays email chains that include the user as a recipient. The first part 610 may display the email chains that are filtered based on the topic map 122 and the author map 124. The user may select an email chain in the first part 610 to view the email messages included in the email chain. The user interface 600 may also include a second part 620 that displays details of an email message that is selected in the first part 610. In addition, the user interface 600 includes a third part 630 that displays one or more email chains that are related to the email chain that is selected in the first part 610.

As shown in FIG. 7, the email client 130 receives the selection of the email chain, as shown at block 705. The email client 130 may determine the email chain's content and relationship to other email chains and assign a score C to each of the other email chains based on the matching content, as shown at block 710. For example, the score C may be based on the topic map 122. In an example, the score C may be a number of matching topics between the selected email chain and the other email chain. The email text for which the attachment is associated may serve as "annotation" for the email attachment, which the system 100 uses to determine relevance score C of the attachment. The relevance score may also be determined based on an attachment context, an attachment content, an attachment name, an attachment size, an attachment type, a past history of relevance or any other factors. As an example, the confidence level C may be increased if the email chain contains related words and phrases that are relevant to a search query or to the words and phrases of another email chain.

In an example, the email client 130 additionally assigns the other email chains a score S based on the author map 124, as shown at block 715. For example, the email client, for the selected email chain, may determine each author/recipient's relationship to other users in the system based on the author map 124. The email client 130 subsequently assigns the other email chains a relevance score corresponding to the selected email chain. The email client 130 may use C as the relevance score itself, or alternatively calculates a relevance score based on both C and S, as shown at block 720.

The email client 130 compares the relevance score with a predetermined threshold to determine if the other email chain is relevant to the selected email chain, as shown at block 730. If an email chain of another user is deemed to be relevant to the user of the email client 130 with at least the predetermined threshold the user of the email client 130 is provided access to the other email chain if the owner(s) of the email chain has not restricted access, as shown at blocks 732, 735. The email client 130 may also consider copyright restrictions, so that email chains and attachments deemed to have entangling copyright restrictions may automatically be accessible only as a "snippet," or fragment, as shown at blocks 740, 745.

In another example, if an email attachment of the other user is deemed to be relevant to the user of email client 130 with at least the predetermined threshold confidence level, the user of the email client 130 may access the email attachment barring any access restrictions. In an example, a link to the attachment of the other user may appear in an email of the user. Alternatively or in addition, the actual email attachment of the other user may be attached to an email of the user. In another example, a link to the attachment may appear in a separate area such as the third part 630, of the user interface 600, but not in the email itself. In yet another example, a link to the attachment may appear in an application not directly associated with the user interface 600 (for example, a separate web page). Further yet, the actual attachment may appear in a separate area or repository, separate from the email clients. This may be referred to as "probabilistic" tunneling to other attachments, where the probability is increased when the confidence level, C, is increased.

In an example, the email client 130 prevents access to an email address of the other user, whose email chain (or email attachment) is being accessed by the user of the email client 130. For example, in some scenarios, the other user may provide his/her email address (or a secondary email addresses) so that others, such as the user of email client 130, upon accessing the email chain or the attachment may ask the other user about the contents of the email chain or the attachment (such as a presentation). In other scenarios, the other user may not wish to be provide the email address. In other examples, alternative indicators of the other user's identity may be provided, such as a username, a telephone number, and/or a profile link.

The presentation characteristics of the other email chain or attachment identified being relevant to the selected email chain depends on the relevance score. For example, size, symbol, color, annotation, or position (including position in a list) in the third part 630 reflects the relevance score of the item.

In another example, the logic illustrated in FIG. 7 may be implemented by the email server 120. According to the examples described, the system 100 provides an automatic approach for creating rich, versatile, and useful repositories and catalogs of email chains and email attachment content.

In yet another example, the system 100 works only with email attachment. For example, the email client 130 (or the email server 120) identifies email messages with attachments, and determines "topic" of the attachments based on email text, which is used as "annotation" of the attachment. The email client 130 determines if the email attachment of the other user relevant to the user of the email client 130 with at least a predetermined confidence level. The email client 130 may further determine if the user has permission to view the attachment of the other user. The email client 130 may subsequently provide the user of the email client 130 access to a link to the attachment, or the actual attachment in an email to the user. Alternatively or in addition, the email client 130 may provide the user a link to the attachment in the third part 630 of the user interface 600. Alternatively or in addition, the email client 130 may provide a link to the attachment in a separate application or store the actual attachment in a repository, such as a user groups repository, which can be used by the system to locate relevant attachments.

Thus, the system 100 provides technical solutions to arbitrarily order sections of an email chain. The system 100 also provides technical solutions to display an email chain using a navigation interface for traversing based on topics and/or author maps. The system 100 provides technical solutions to tunnel from one email chain into another, based on social network and text analysis. The system 100 provides technical solutions to filter email chains based on combinations of content and social proximity. The system 100 provides technical solutions to intelligently link email chains and attachments based on relevance according to topics and social network analysis.

Figure 8:
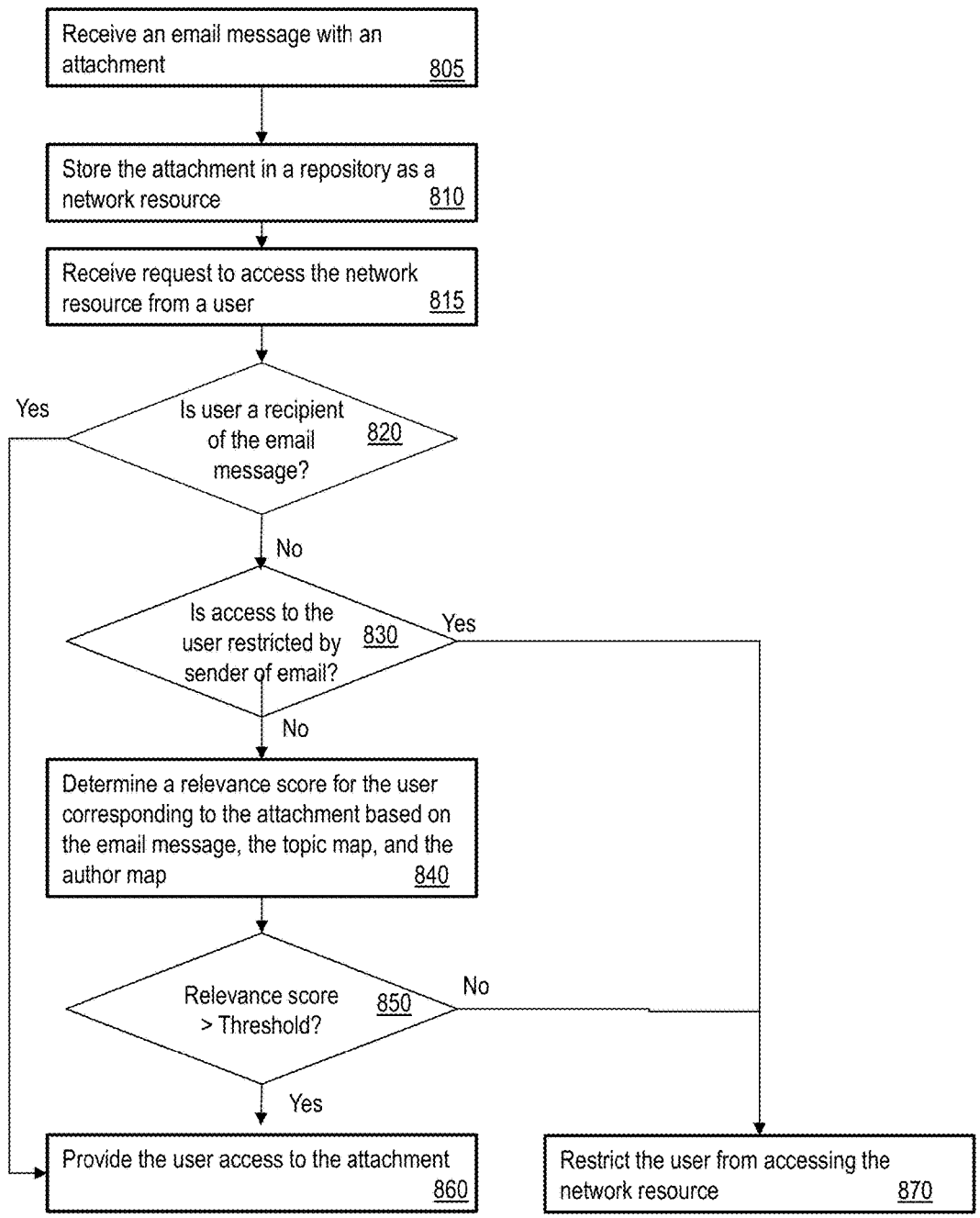
FIG. 8 illustrates a flowchart of example logic for providing access to an email attachment as a network resource in accordance with an embodiment.

FIG. 8 illustrates a flowchart of example logic for providing access to an email attachment as a network resource. The sender's email client 110 sends the email message 112 directed to the receiver's email client 130 via the email server 120, as shown at block 805. The email server 120 identifies that the email message 112 has an email attachment. The email server 120 stores the email attachment as a network resource. For example, the email server 120 may store the email attachment in a server or a repository. In an example, the email server 120 sends the email message to the receiver's email client 130 with the email attachment. In another example, the email server 120 sends the email message 112 without the email attachment. Instead, the email message 112 contains a link to the location of the network resource, the link replacing the email attachment. The receiver at the receiver's email client 130 accesses the network resource via the link, as shown at blocks 815 and 820.

In another example, the third user at the third user's email client 440 requests access to the network resource, as shown at block 815. For example, the third user tunnels to the email message 112 as described by various examples throughout the present document and requests access to the email attachment. The email server 120 identifies that the third user is not a recipient of the email message 112. The email server 120 determines if the sender of the email message 112 restricted the third user from accessing the email attachment, which is now stored as the network resource, as shown at block 830. If the third user is restricted, access is prohibited, as shown at block 870. Else, the email server 120 determines a relevance score for the third user corresponding to the email attachment based on the topic map 122 and the author map 124 using one of the techniques described throughout the present document, as shown at block 840. If the relevance score is above a predetermined threshold, the third user may be provided access to the network resource, as shown at blocks 850 and 860. Else, of the relevance score does not satisfy the predetermined threshold, the third user is restricted from accessing the network resource, as shown at block 870.

Text-based e-mail and instant messaging are the overwhelmingly preferred method for business communications. The volume, importance, and Business Intelligence value of the information being transmitted through these mediums often cannot be adequately measured. A major deficiency is the lack of intelligent tools/mechanisms in current e-mail and IM systems that effectively profile, mine, analyze, organize, and prioritize the vast amounts of highly relevant information users have to deal with manually. Thus, the technical solutions described throughout the present application profiles and mines e-mail and message information using multiple analytics techniques. The analytics process applies specific knowledge domain metadata that is aligned to the cross-domain context map using semantic mapping based on web markup language standards such as resource description framework (RDF) and web ontology language (OWL).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A system comprising:
an email server configured to:
generate a topic map of email messages stored on the email server, the topic map indicative of a frequency of a topic being in email messages received or sent by a user with an account on the email server;
generate an author map of users with accounts on the email server, the author map comprising connections between pairs of the users with accounts, each connection being assigned a weight based on a frequency of communication between the users associated with the connection;
receive an email message from an author, the email message directed to a receiver;
determine a relevance score of the email message with a third user based on the frequency of a topic of the email message associated with respect to the third user and the weight of the author map connection between the author and the third user; and
send an alert message associated with the email message to an email client of the third user in response to the relevance score being greater than a predetermined threshold.

2. The system of claim 1, wherein the topic associated with the email message is based on analysis of text of the email message.

3. The system of claim 2, wherein the author map connection identifies the topic being shared by the author and the third user.

4. The system of claim 3, wherein the author map connection identifies the topic being shared by the author and the third user based on at least one of:
a frequency of communication between the author and the third user about the topic;
the author and the third user being associated with a common project and the topic corresponding to the common project; and
organizational roles of the author and the third user respectively.

5. The system of claim 2, wherein the email server is further configured to:
detect access rights associated with the email message; and
update the relevance score of the email message based on the access rights.

6. The system of claim 5, wherein the access rights are associated with the email message by the author.

7. The system of claim 6, wherein the email server sends the email message to the third user in response to the third user being provided access rights to access the email message.

8. The system of claim 1 further comprising:
the email client of the third user, wherein the email client is configured to:
receive, from the email server, the alert associated with the email message; and
display the alert in a separate area of a user interface in response to the email message being directed to the third user based on the topic and the author map connection.

9. The system of claim 8, wherein the email message is a first email message, and the email client is further configured to:
facilitate the third user to view a link to a second email message, wherein the second email message is associated with the first email message based on the topic of the first email message and a second social map connection between the third user and a user of the second email message.

10. A computer product comprising non-transitory computer readable storage medium, the non-transitory computer readable storage medium comprising computer executable instructions, wherein the non-transitory computer readable storage medium comprises instructions to:
order email messages received by a first user according to a topic map and an author map, wherein the email messages are ordered in a first area of an email client, the topic map indicative of a frequency of a topic in email messages received or sent by the first user, and the author map comprising connections between the first user and users that have communicated with the first user via the email messages, each connection being assigned a weight based on a frequency of communication between the users associated with the connection; and
display a second email message in a second area of the email client in response to selection of a first email message in the first area, wherein the second email message is sent by an author of the first email message to a third user, not sent to the first user, and selection of the second email message comprises:
determining a relevance score of the second email message with the first user based on the frequency of a topic of the second email message with respect to the first user and the weight of the author map connection between the author of the second email message and the first user.

11. The computer product of claim 10, wherein the non-transitory computer readable storage medium further comprises:
instructions to verify that the first user has access rights to the second email message prior to the second email message being displayed in the second area, wherein the access rights are determined based on:
the second email message sharing a topic with the first email message, and
the second email message being sent by a second user that sent the first email message.

\* \* \* \* \*